US011170959B2

(12) United States Patent
Kuo et al.

(10) Patent No.: US 11,170,959 B2
(45) Date of Patent: Nov. 9, 2021

(54) ELECTROMAGNETIC RELAY

(71) Applicant: EXCEL CELL ELECTRONIC CO., LTD., Taichung (TW)

(72) Inventors: Ming-Chang Kuo, Taichung (TW); Rong-Hong Lai, Taichung (TW)

(73) Assignee: EXCEL CELL ELECTRONIC CO., LTD., Taichung (TW)

( * ) Notice: Subject to any disclaimer, the term of this patent is extended or adjusted under 35 U.S.C. 154(b) by 50 days.

(21) Appl. No.: 16/739,902

(22) Filed: Jan. 10, 2020

(65) Prior Publication Data

US 2020/0234900 A1 Jul. 23, 2020

(30) Foreign Application Priority Data

Jan. 19, 2019 (TW) ................................ 108102130

(51) Int. Cl.

| | |
|---|---|
| ***G06F 3/00*** | (2006.01) |
| ***H01H 50/16*** | (2006.01) |
| ***G06F 1/16*** | (2006.01) |
| ***H01H 50/58*** | (2006.01) |
| *G06F 3/01* | (2006.01) |

(52) U.S. Cl.

CPC ........... *H01H 50/16* (2013.01); *G06F 1/1626* (2013.01); *G06F 1/1643* (2013.01); *H01H 50/58* (2013.01)

(58) Field of Classification Search

None

See application file for complete search history.

(56) References Cited

U.S. PATENT DOCUMENTS

| | | | | |
|---|---|---|---|---|
| 4,879,536 A * | 11/1989 | Taguchi | H01H 50/18 | 335/128 |
| 2005/0264386 A1* | 12/2005 | Chida | H01H 50/546 | 335/128 |
| 2007/0084633 A1* | 4/2007 | Lee | H01H 50/048 | 174/564 |
| 2014/0028418 A1* | 1/2014 | Yamashita | H01H 50/38 | 335/201 |
| 2019/0131097 A1* | 5/2019 | Minowa | H01H 50/546 | |

FOREIGN PATENT DOCUMENTS

TW 352444 B 2/1999

OTHER PUBLICATIONS

Sep. 4, 2019 (TW) Search Report issued to Taiwanese counterpart application No. 108102130—Eng Tran.

* cited by examiner

*Primary Examiner* — Toan H Vu

(74) *Attorney, Agent, or Firm* — Banner & Witcoff, Ltd.

(57) ABSTRACT

An electromagnetic relay includes a base having a receiving space, an electromagnetic unit disposed outside of the receiving space, a magnetically attractive member magnetically attractable by the electromagnet unit, a first stationary contact disposed in the receiving space, a second stationary contact, a movable terminal member and a movable contact. When the electromagnetic unit is energized, the movable terminal member is pushed by the magnetically attractive member and the movable contact contacts one of the first and second stationary contacts. When the electromagnetic unit is de-energized, the movable contact contacts the other one of the first and second stationary contacts.

10 Claims, 9 Drawing Sheets

3
4(42)
CL
41
32
212
211
200
6
5
2121
21(211)
213
Z
Y
X 71
711
7
712
72
X
Z
Y
2121
2121
21(211)
213
213
212
200
52
512
5
51(511)
61(611)
62
6
612

ELECTROMAGNETIC RELAY

CROSS-REFERENCE TO RELATED APPLICATION

This application claims priority to Taiwanese Patent Application No. 108102130, filed on Jan. 19, 2019.

FIELD

The disclosure relates to an electromagnetic relay that can minimize a current flow path.

BACKGROUND

Referring to FIGS. 1 and 2, an existing electromagnetic relay 1 includes a base 11 having first and second sides 111, 112 spaced apart from each other along a front-rear direction (Y), an electromagnet 12 mounted to the base 11 along a top-bottom direction (Z), first to third terminal units 13, 14, 15, and a magnetically attractive plate 16. The first terminal unit 13 is proximate to the first side 111, and includes a first spring plate 131 extending along a left-right direction (X), a first terminal leg 132 extending downwardly through the base 11 from the first spring plate 131, and a first terminal contact 133 fixed on the first spring plate 131. The second terminal unit 14 faces the first terminal unit 13, and includes a second spring plate 141 spaced apart from the first spring plate 131 along the top-bottom direction (Z), a second terminal leg 142 extending downwardly through the base 11 from the second spring plate 141, and a second terminal contact 143 fixed on the second spring plate 141 and facing the first terminal contact 133. The third terminal unit 15 is proximate to the second side 112, and includes a third terminal leg 151, a third spring plate 152 extending upwardly from the third terminal leg 151 and then bent inwardly to be disposed between the first and second spring plates 131, 141, and a third terminal contact 153 fixed on the third spring plate 152 and contactable with one of the first and second terminal contacts 133, 143. The magnetically attractive plate 16 is fixed to a bottom surface of the third spring plate 152 and is proximate to the electromagnet 12.

As shown in FIG. 2, when the electromagnet 12 is energized and attracts the magnetically attractive plate 16 to move the third terminal contact 153 to contact the first terminal contact 133, the electromagnetic relay 1 is placed in a first circuit state, and the third spring plate 152 stores a restoring force. When the electromagnet 12 is de-energized, the restoring force of the third spring plate 152 is released, causing the magnetically attractive plate 16 to move away from the electromagnet 12 and biasing the third terminal contact 153 to move away from the first terminal contact 133 and contact the second terminal contact 143. The electromagnetic relay 1 is transitioned from the first circuit state to a second circuit state.

Although the electromagnetic relay 1 can be transitioned from the first circuit state to the second circuit state, and vice versa, because the length of each of the first, second and third terminal legs 132, 142, 151 is long along the top-bottom direction (Z), a current flow path is long and an internal resistance is increased, thereby reducing the performance of the electromagnetic relay 1. Further, to ensure the sensitivity of the electromagnetic relay 1, the resiliency of the third spring plate 152 has to be maintained, so that the thickness of the third terminal leg 151 cannot be increased, thereby limiting a permissible current of the electromagnetic relay 1.

SUMMARY

Therefore, an object of the present disclosure is to provide an electromagnetic relay that can minimize a current flow path and that can reduce an internal resistance.

Accordingly, an electromagnetic relay of this disclosure includes a base, an electromagnet unit, an armature unit, a first terminal unit, a second terminal unit and a movable terminal unit.

The base includes a first base wall, a second base wall facing and spaced apart from the first base wall along a first direction of the base, and a receiving space bounded by the first and second base walls. The electromagnetic unit is mounted to the base in proximity to the second base wall and outside of the receiving space. The electromagnetic unit is distal to the first base wall, and has a central line transverse to the first direction. The armature unit is disposed on the base and is connected to the electromagnetic unit. The armature unit includes a magnetically attractive member magnetically attractable by the electromagnet unit. The first terminal unit is mounted to and extends through the first base wall, and includes a first stationary contact disposed in the receiving space and facing the second base wall. The second terminal unit is mounted to the second base wall, extends through the first base wall, and includes a second stationary contact disposed in the receiving space and spaced apart from and facing the first stationary contact along the first direction. The movable terminal unit includes a movable terminal member penetratingly mounted to the first base wall and extending between the first and second terminal units, and a movable contact disposed on the movable terminal member and located between the first and second stationary contacts. The magnetically attractive member is capable of pushing the movable terminal member.

When the electromagnetic unit is energized and attracts the magnetically attractive member, the movable terminal member is pushed by the magnetically attractive member, and the movable contact contacts one of the first and second stationary contacts. When the electromagnetic unit is de-energized, the magnetically attractive member is released from the electromagnetic unit, and the movable contact contacts the other one of the first and second stationary contacts.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
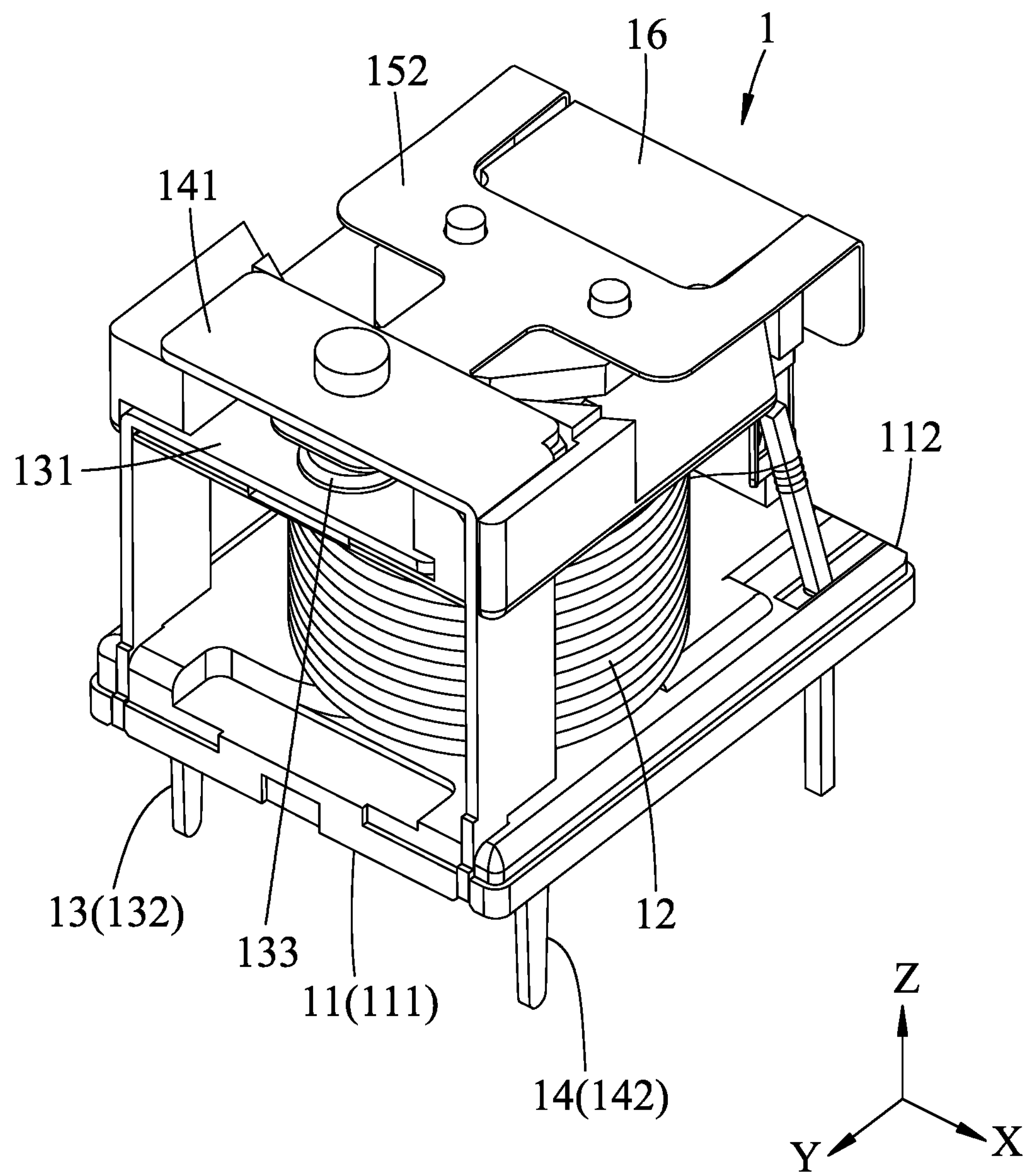
FIG. 1 is a perspective view of an existing electromagnetic relay.
Figure 2:
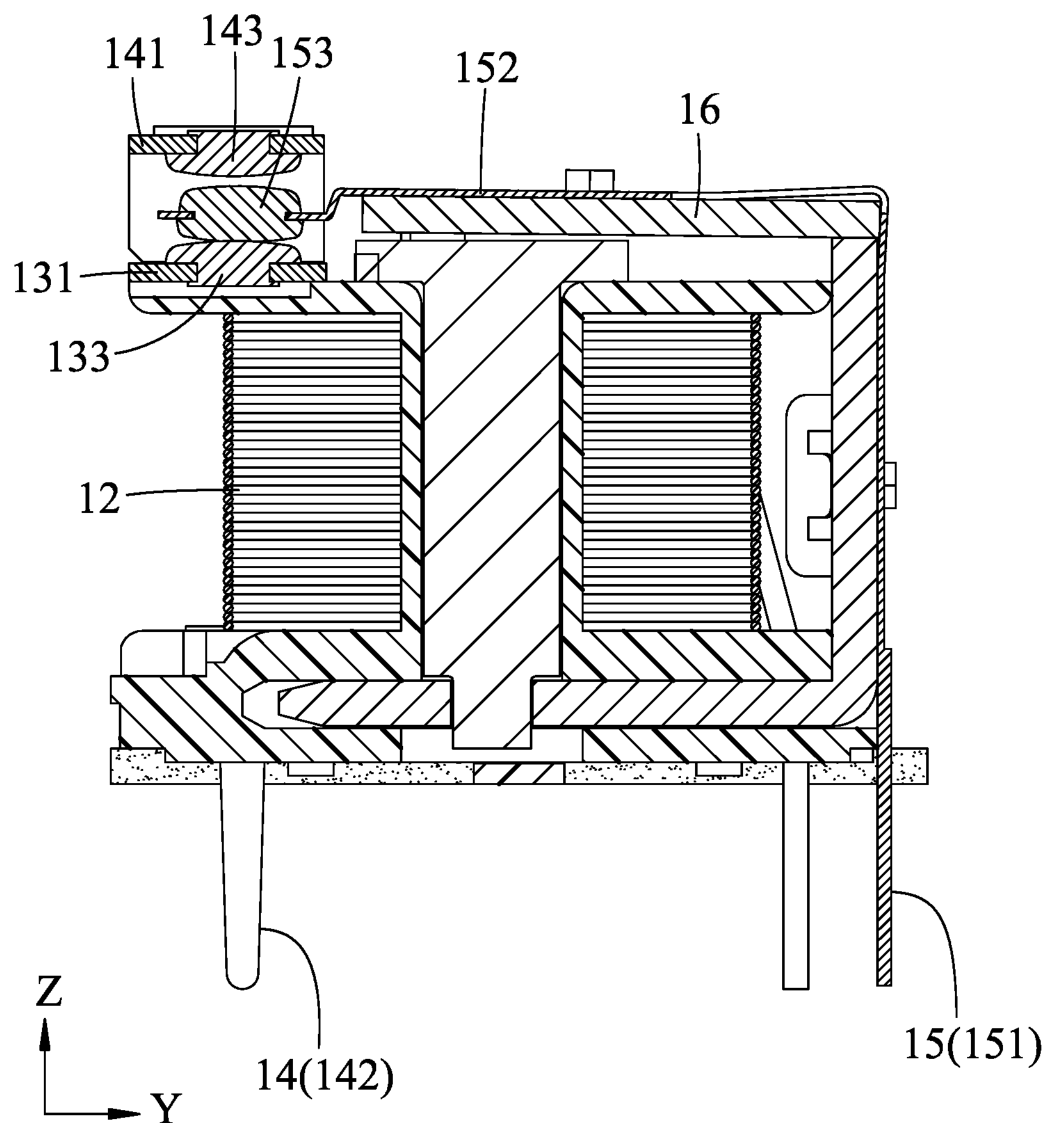
FIG. 2 is a sectional view of the existing electromagnetic relay.
Figure 3:
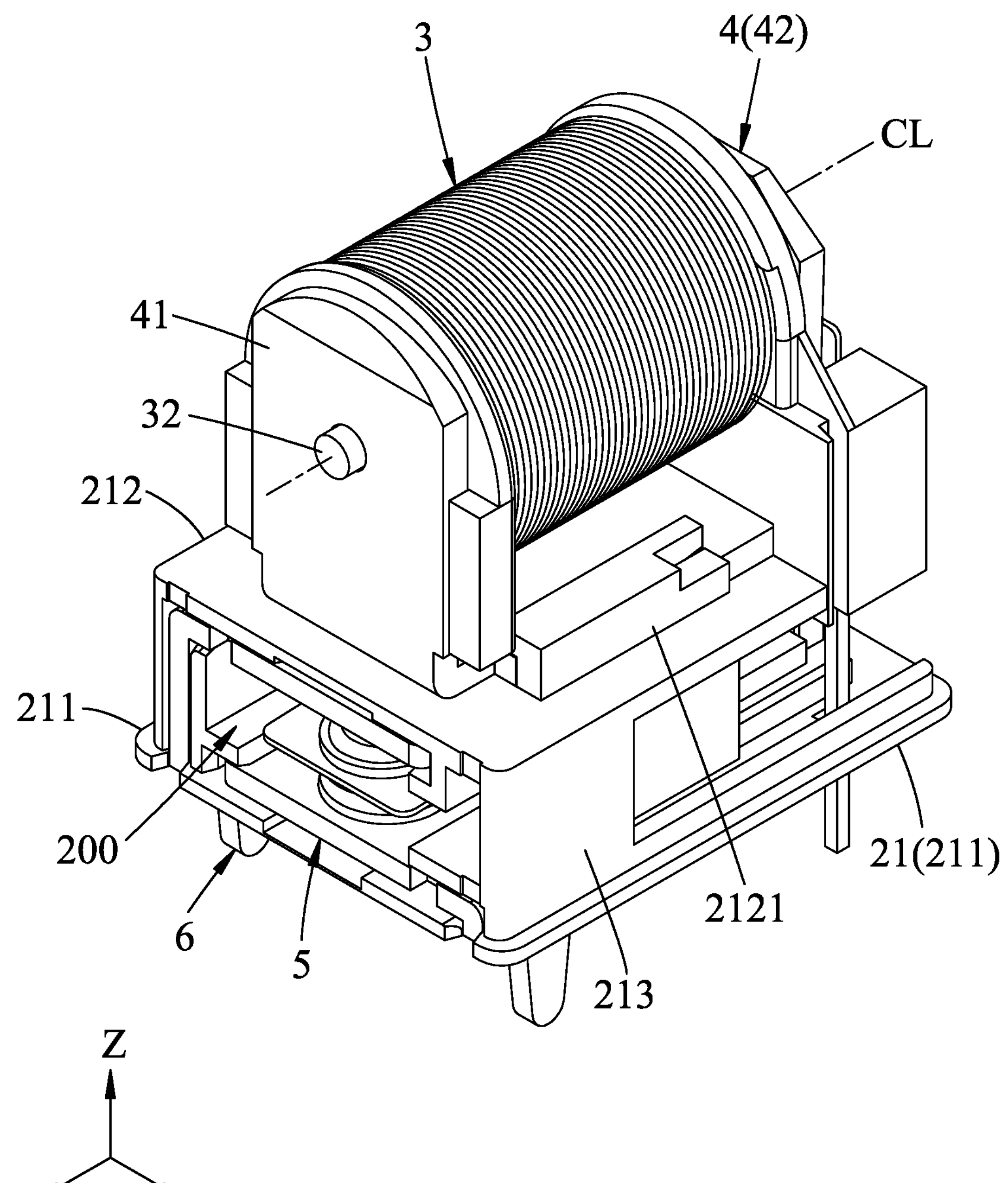
FIG. 3 is a perspective view of an electromagnetic relay according to an embodiment of the present disclosure.
Figure 4:
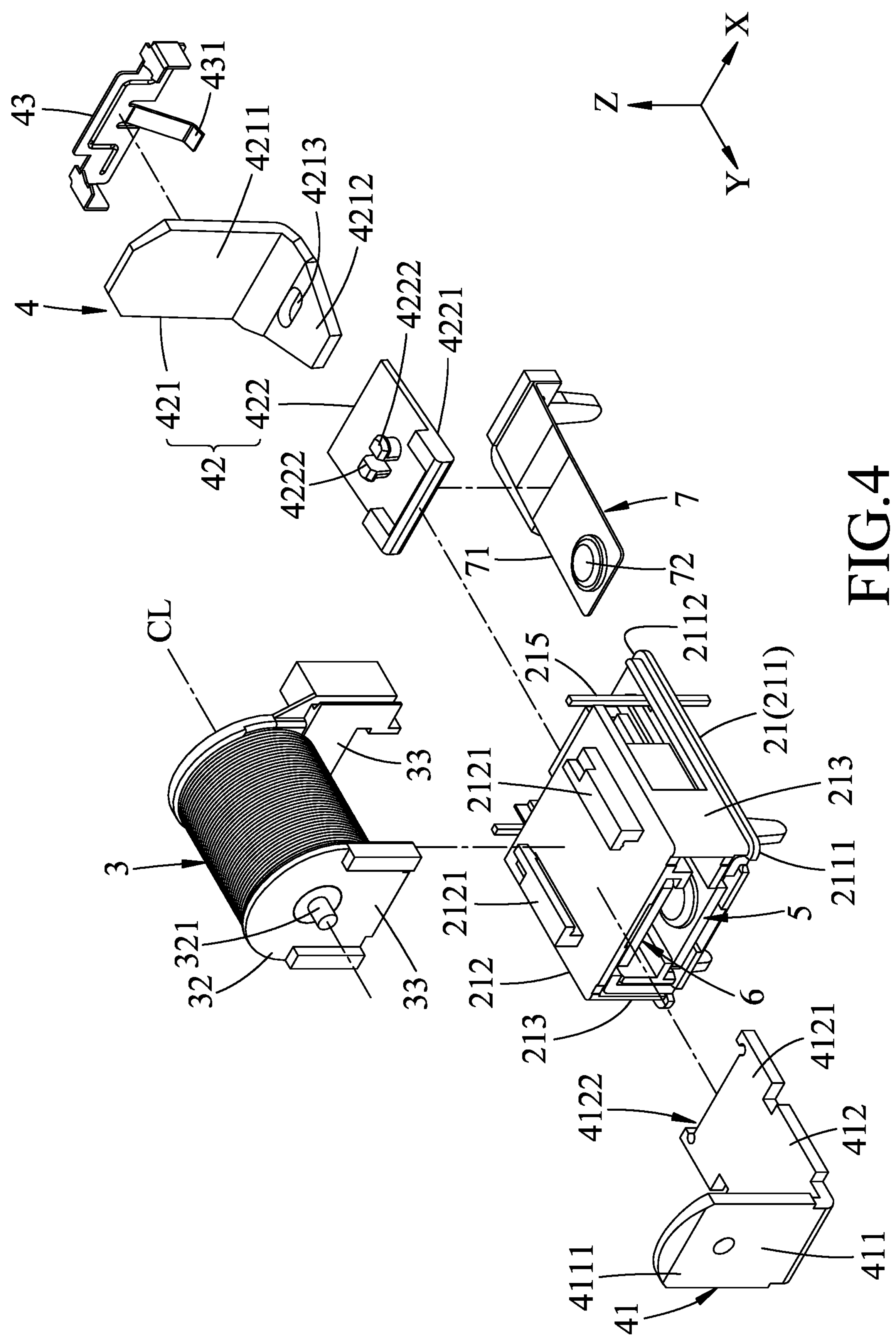
FIG. 4 is an exploded view of the embodiment.
Figure 5:
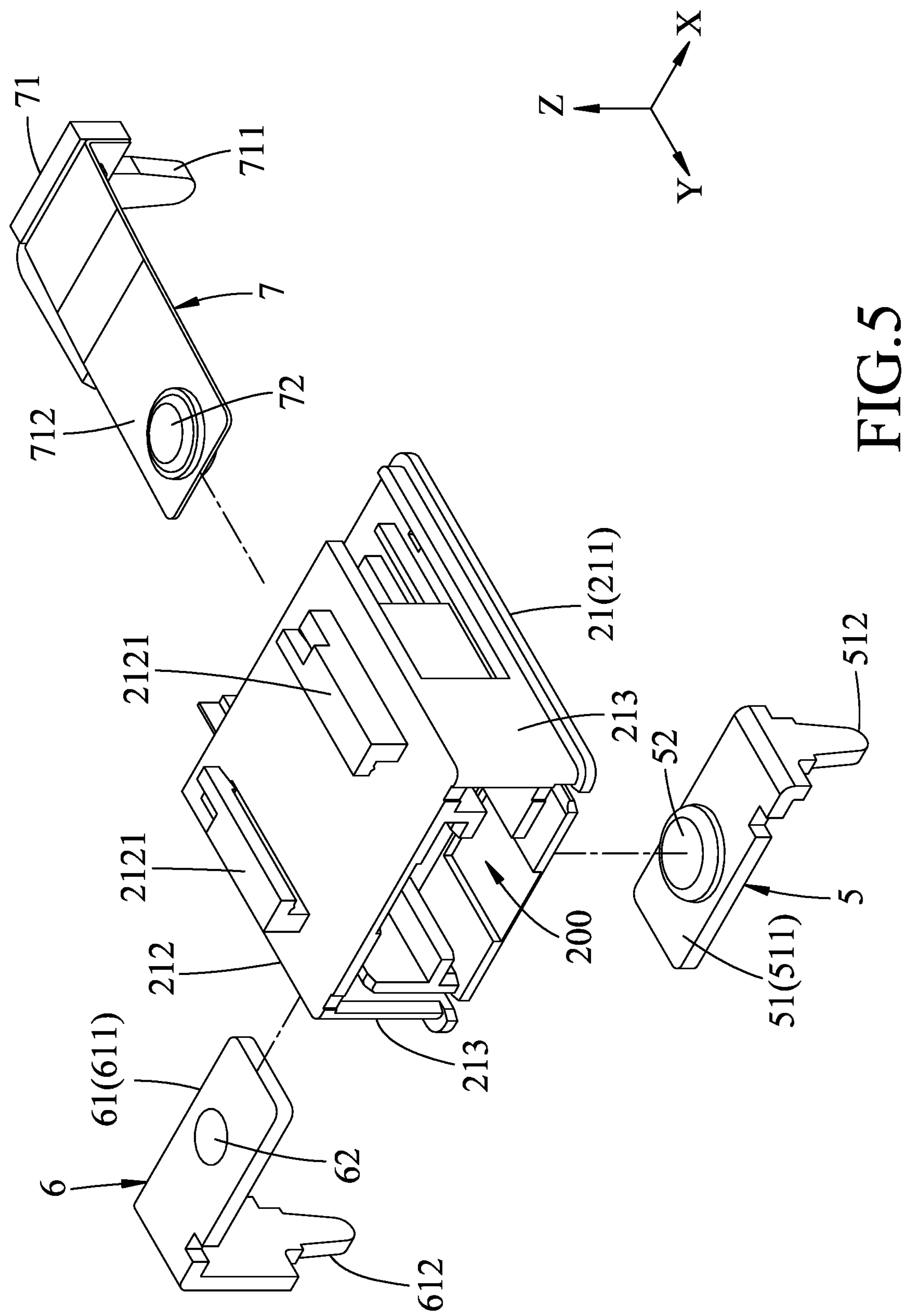
FIG. 5 is an exploded view of a base, a first terminal unit, a second terminal unit and a movable terminal unit of the embodiment.

Referring to FIGS. 3 to 5, an electromagnetic relay according to an embodiment of the present disclosure includes a base 21, an electromagnetic unit 3, an armature unit 4, a first terminal unit 5, a second terminal unit 6 and a movable terminal unit 7.

The base 21 includes a first base wall 211, a second base wall 212 and two side walls 213. The first and second base walls 211, 212 face and are spaced apart from each other along a first direction (Z) of the base 21. The second base wall 212 is higher than the first base wall 211 along the first direction (Z), and has two fixed blocks 2121 formed on top thereof and spaced apart from each other along a second direction (X) transverse to the first direction (Z). In this embodiment, the first direction (Z) is a top-bottom direction, while the second direction (X) is a left-right direction. The side walls 213 are spaced apart from each other along the second direction (X) and are connected between the first and second base walls 211, 212. The first and second base walls 211, 212 and the side walls 213 cooperatively bound a receiving space 200.

Figure 8:
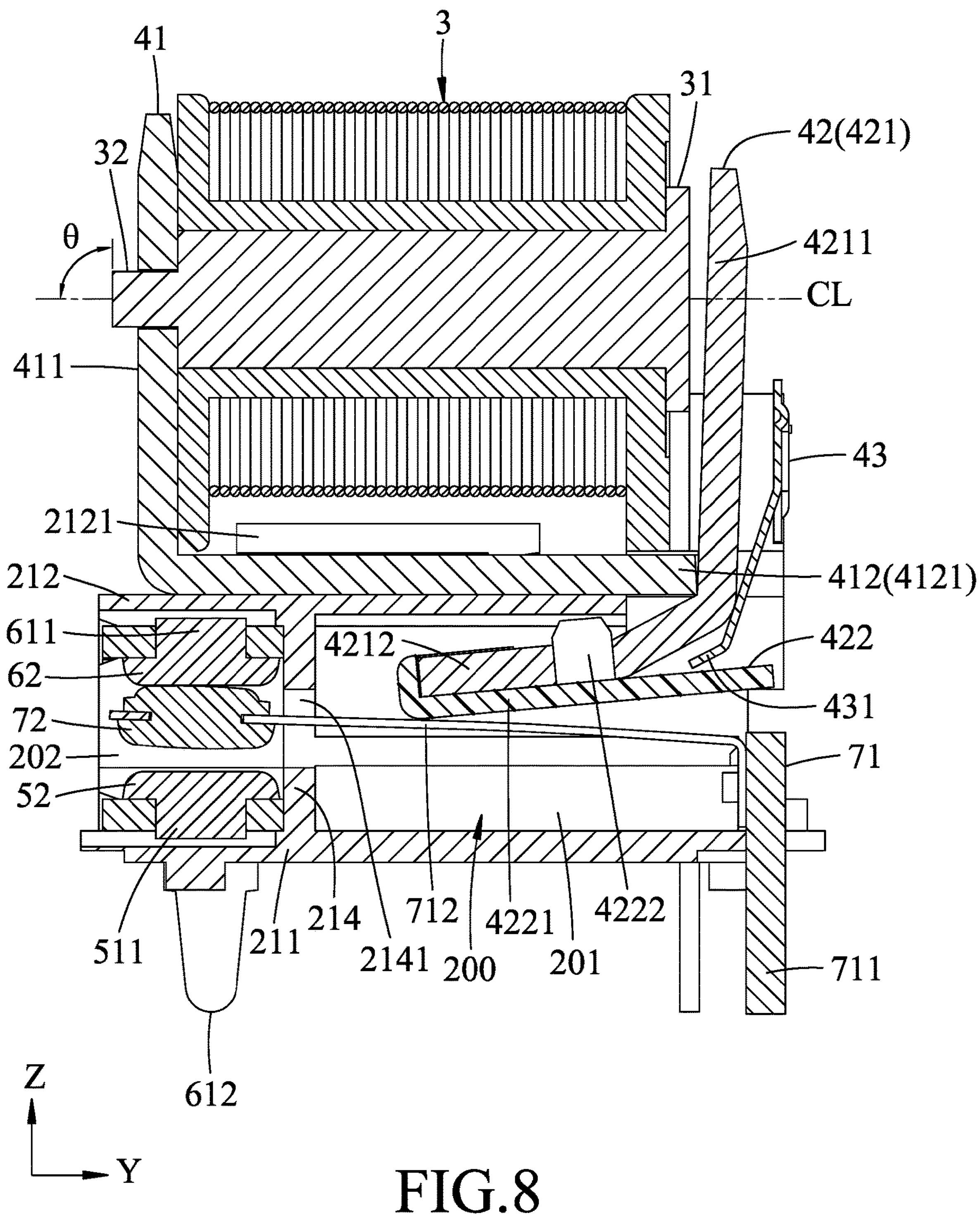
FIG. 8 is a sectional view of the embodiment, illustrating a movable contact of the movable terminal unit in contact with a second stationary contact of the second terminal unit when an electromagnetic unit of the embodiment is in a de-energized state.

As shown in FIG. 8, the base 21 further includes a partition wall 214 disposed within the receiving space 200 and connected between the first and second base walls 211, 212 and between the side walls 213. The partition wall 214 divides the receiving space 200 into a first chamber 201 and a second chamber 202, and has an opening 2141 communicating with the first and second chambers 201, 202. In this embodiment, the first base wall 211 is longer than the second base wall 212 along a third direction (Y) transverse to the first and second directions (Z, X), and has a first end 2111 proximate to the second base wall 212, and a second end 2112 opposite to the first end 2111 along the third direction (Y) and distal to the second base wall 212. The third direction (Y) is a front-rear direction. Two spaced-apart support posts 215 are provided on the first base wall 211 in proximity to the second end 2112 thereof.

Figure 7:
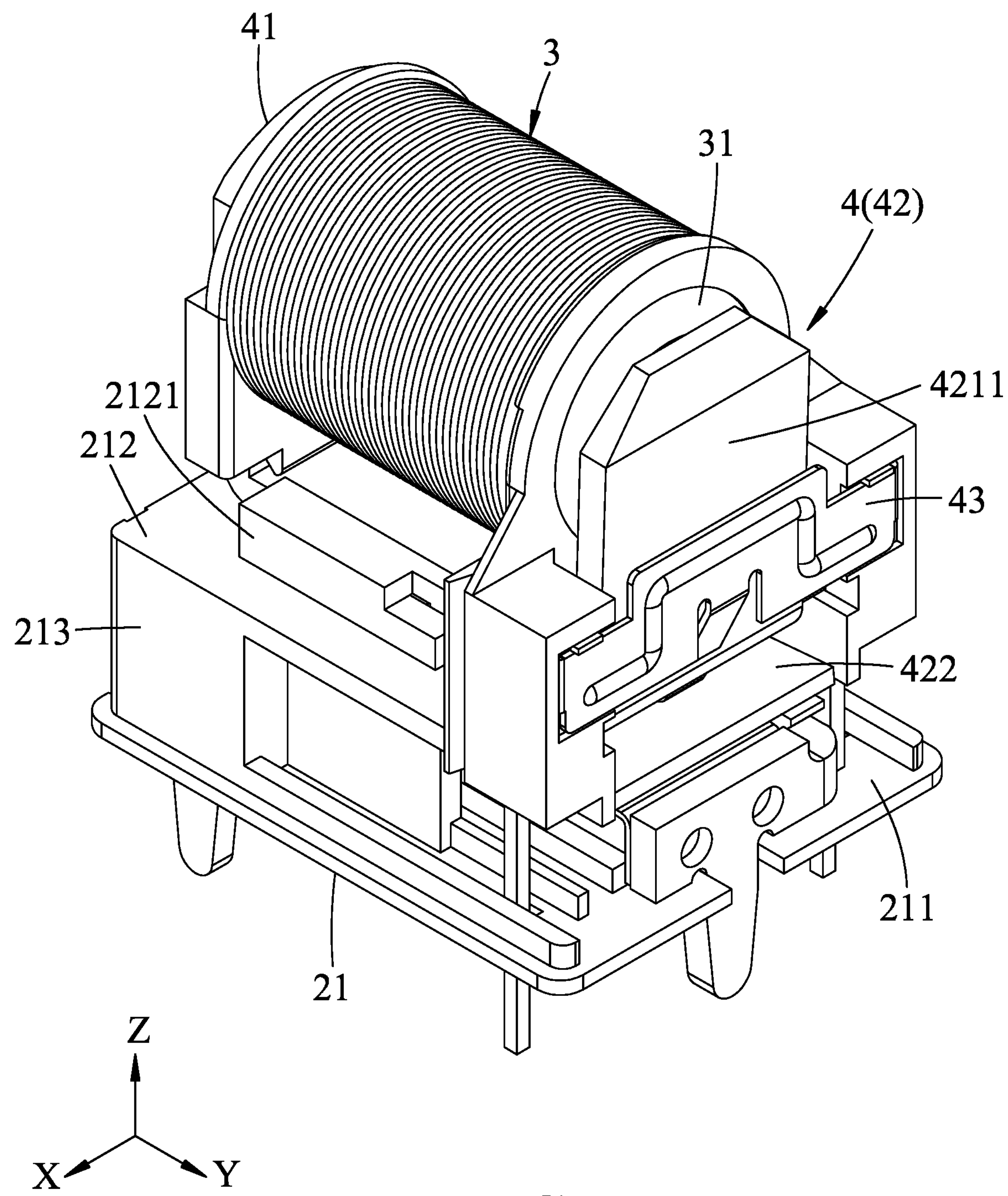
FIG. 7 is a view similar to FIG. 3, but taken from another angle.

Referring to FIGS. 7 and 8, in combination with FIGS. 3 and 4, the electromagnetic unit 3 is used for generating an electromagnetic force when energized, and is mounted to the base 21 in proximity to the second base wall 212 and outside of the receiving space 200. The electromagnetic unit 3 is distal to the first base wall 211, and has a central line (CL) transverse to the first direction (Z) at an angle (θ) ranging between 85 degrees and 95 degrees. The electromagnetic unit 3 includes a first end 31 and a second end 32 opposite to each other along the central line (CL). In this embodiment, the angle (θ) is 90 degrees, and the central line (CL) is parallel with the third direction (Y), and is also transverse to the second direction (X). The first end 31 is proximate to the first chamber 201, and is supported by the support posts 215.

The armature unit 4 is disposed on the base 21, is connected to the electromagnetic unit 3, and includes a magnetic member 41, a magnetically attractive member 42 and a resilient member 43.

The magnetic member 41 is an L-shaped plate member including a first plate 411 extending along the first direction (Z), and a second plate 412 connected to the first plate 411 and extending along the third direction (Y). The first plate 411 has a fixing end 4111 for fixing of a shaft 321 protruding out of the second end 32 of the electromagnetic unit 3 thereto. The second plate 412 is inserted between the fixed blocks 2121, and has a connection end 4121 opposite to the fixing end 4111 and formed with a receiving notch 4122.

Figure 6:
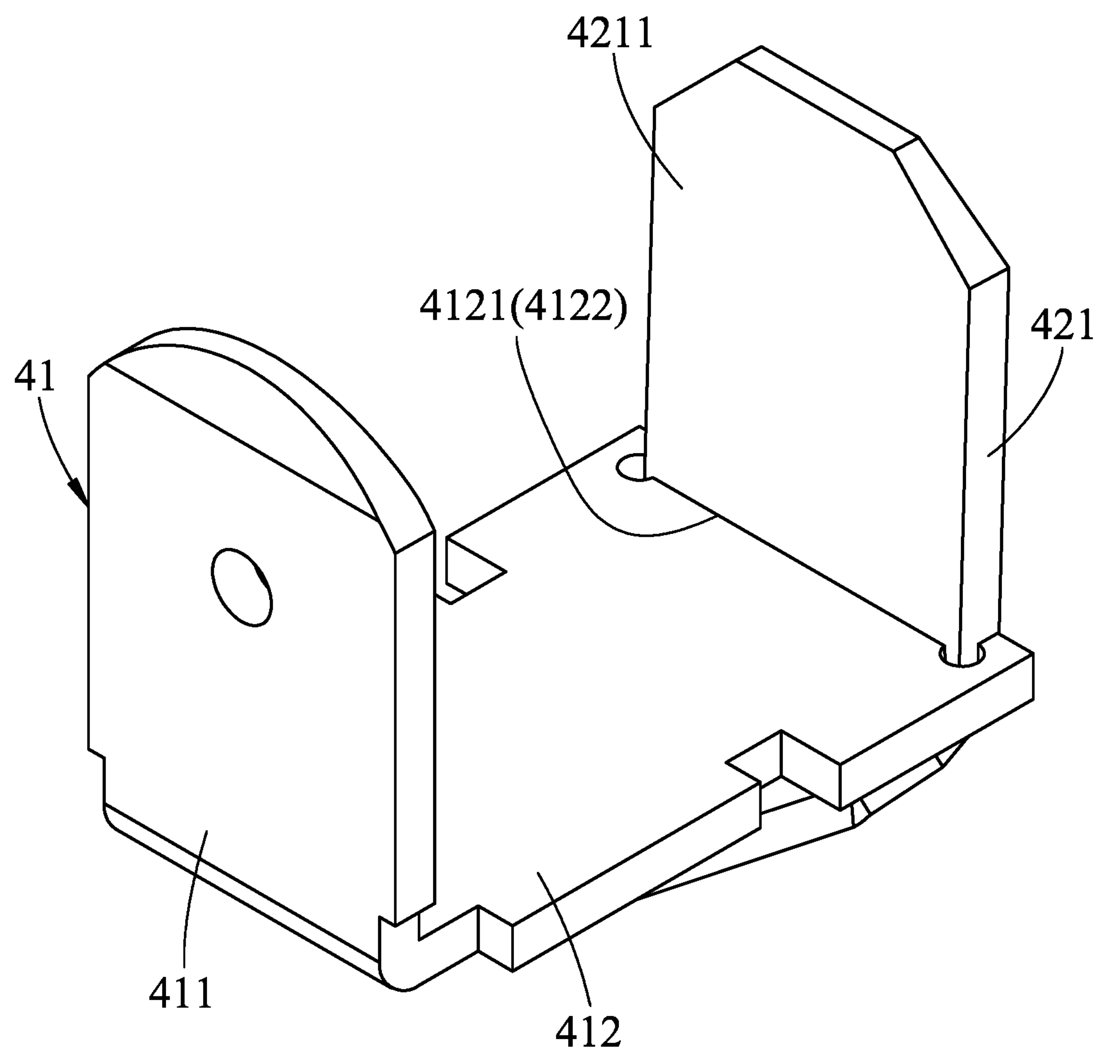
FIG. 6 is a perspective view, illustrating how a magnetic member and a magnetically attractive plate of an armature unit are interconnected.

The magnetically attractive member 42 includes a magnetically attractive plate 421 proximate to the electromagnetic unit 3, and an insulator plate 422 connected to the magnetically attractive plate 421. The magnetically attractive plate 421 includes an armature portion 4211 and a pushing portion 4212. The armature portion 4211 has an upper part magnetically attractable by the first end 31 of the electromagnetic unit 3, and a lower end opposite to the upper part. The pushing portion 4212 is bent from the lower end of the armature portion 4211, and is formed with a slot 4213. The insulator plate 422 has an insulator portion 4221, and two spaced-apart interlocking protrusions 4222 protruding from the insulator portion 4221 and interlocking with the slot 4213 of the pushing portion 4212. The pushing portion 4212 and the insulator plate 422 are inserted into the first chamber 201 such that the interlocking protrusions 4222 face the second base wall 212, and the lower end of the armature portion 4211 is received in the receiving notch 4122 so as to connect the magnetically attractive member 42 to the magnetic member 41, as shown in FIG. 6.

The resilient member 43 is mounted to the first end 31 of the electromagnetic unit 3. In this embodiment, the resilient member 43 is a single-piece metallic resilient plate, and has a biasing arm 431 abutting against a junction of the armature portion 4211 and the pushing portion 4212 of the magnetically attractive plate 421.

As shown in FIGS. 4, 5 and 8, the first terminal unit 5 includes a first terminal member 51 and a first stationary contact 52. The first terminal member 51 has a first terminal body 511 and a first terminal leg 512. The first terminal body 511 is fixed to the first base wall 211 within the second chamber 202, and extends along the second direction (X). The first terminal leg 512 is bent downwardly from one end of the first terminal body 511, which is proximate to one of the side walls 213, along the first direction (Z) and extends through the first base wall 211. The first stationary contact 52 is disposed on the first terminal body 511 and faces the second base wall 212.

The second terminal unit 6 includes a second terminal member 61 and a second stationary contact 62. The second terminal member 61 has a second terminal body 611 and a second terminal leg 612. The second terminal body 611 is fixed to a bottom side of the second base wall 212 within the second chamber 202, and extends along the second direction (X). The second terminal leg 612 is bent downwardly from one end of the second terminal body 611, which is proximate to the other side wall 213, along the first direction (Z) and extends through the first base wall 211. The second stationary contact 62 is disposed on the second terminal body 611, is located in the second chamber 202, and faces the first stationary contact 52. The first and second stationary contacts 52, 62 are spaced apart from each other along the first direction (Z).

The movable terminal unit 7 includes a movable terminal member 71 and a movable contact 72. The movable terminal member 71 is penetratingly mounted to the first base wall 211 and extends between the first and second terminal units 5, 6. The movable terminal member 71 is a two-piece structure composed of a conductive leg 711 and a conductive spring plate 712. The conductive leg 711 extends through the first base wall 211. The spring plate 712 extends transversely from the conductive leg 711 along the third direction (Y) and passes through the opening 2141 of the partition wall 214 to be interposed between the first and second terminal units 5, 6. The spring plate 712 is disposed below and abuts against the insulator portion 4221. The movable contact 72 is disposed on the spring plate 712 and is located between the first and second stationary contacts 52, 62. The spring plate 712 biases the movable contact 72 to contact the second stationary contact 62.

In this embodiment, the magnetically attractive member 42 is capable of pushing the movable terminal member 71. The thickness of each of the first and second terminal units 5, 6 is the same as that of the conductive leg 711. Each of the conductive leg 711 and the first and second terminal units 5, 6 is greater in thickness than the spring plate 712. By increasing the thickness of the conductive leg 711 and the first and second terminal units 5, 6, a permissible current of the electromagnetic relay of this disclosure can be increased. When a ratio of the thickness of the conductive leg 711 to the thickness of the spring plate 712 ranges from 2 to 4, a good resiliency of the spring plate 712 and a high permissible current can be simultaneously obtained. In other embodiments, the movable terminal unit 7 may be a single-piece structure having a uniform thickness.

Specifically, the partition wall 214 can increase a creepage distance to enhance safety in use.

Figure 9:
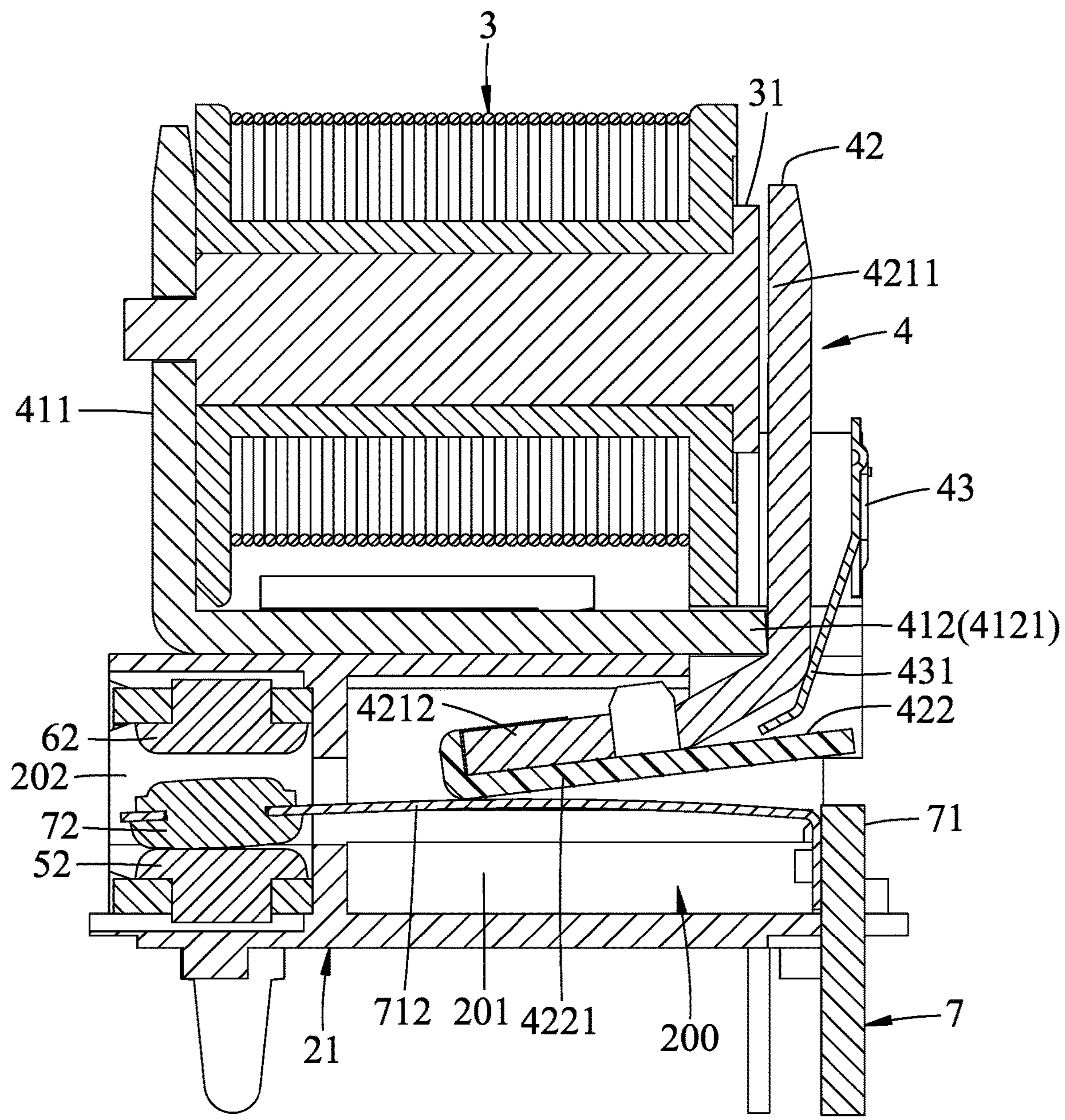
FIG. 9 is a view similar to FIG. 7, but illustrating the movable contact of the movable terminal unit in contact with a first stationary contact of the first terminal unit when the electromagnetic unit is in an energized state.

As shown in FIG. 9, when the electromagnetic unit 3 is energized, the armature portion 4211 of the magnetically attractive plate 421 is magnetically attracted to the first end 31 of the electromagnetic unit 3, and pivots about the connection end 4121 of the second plate 412 which serves as a fulcrum, so that the insulator portion 4221 moves downward and pushes the spring plate 712 to flex downward until the movable contact 72 contacts the first stationary contact 52. At this time, the spring plate 712 stores a restoring force. At the same time, the biasing arm 431 of the resilient member 43 is pushed by the junction of the armature portion 4211 and the pushing portion 4212 of the magnetically attractive plate 421 to store a restoring force.

As shown in FIG. 8, when the electromagnetic unit 3 is de-energized, the armature portion 4211 of the magnetically attractive plate 421 is released from the first end 31 of the electromagnetic unit 3, the restoring force of the biasing arm 431 is released to bias the armature portion 4211 of the magnetically attractive plate 421 to move away from the first end 31 of the electromagnetic unit 3, and the restoring force of the spring plate 712 is also released to bias the movable contact 72 to move away from the first stationary contact 52 and contact the second stationary contact 62. Through this, the electromagnetic relay of this disclosure can be transitioned to different circuit states.

The advantages of the electromagnetic relay of this disclosure can be summarized as follows:

1. Through the hollow configuration of the base 21, and with the electromagnetic unit 3 mounted to the base 21 in proximity to the second base wall 212 and outside of the receiving space 200, the lengths of the first terminal unit 5, the second terminal unit 6 and the movable terminal unit 7 can be reduced along the first direction (Z). Therefore, the electromagnetic relay of this disclosure can minimize a current flow path, reduce an internal resistance, and reduce the temperature rise during operation, thereby increasing its performance.

2. Because the movable terminal member 71 of this embodiment is configured as a two-piece structure, the resiliency of the spring plate 712 can be maintained, and the thickness of the conductive leg 711, the first terminal unit 5 and the second terminal unit 6 can be increased, thereby increasing the permissible current of the electromagnetic relay of this disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An electromagnetic relay, comprising:

a base including a first base wall, a second base wall facing and spaced apart from said first base wall along a first direction of said base, and a receiving space bounded by said first and second base walls;

an electromagnetic unit mounted to said base in proximity to said second base wall and outside of said receiving space, said electromagnetic unit being distal to said first base wall and having a central line transverse to the first direction;

an armature unit disposed on said base and connected to said electromagnetic unit, said armature unit including a magnetically attractive member magnetically attractable by said electromagnet unit;

a first terminal unit mounted to and extending through said first base wall, and including a first stationary contact disposed in said receiving space and facing said second base wall;

a second terminal unit mounted to said second base wall and extending through said first base wall, said second terminal unit including a second stationary contact disposed in said receiving space, said second stationary contact being spaced apart from and facing said first stationary contact along the first direction; and a movable terminal unit including a movable terminal member and a movable contact, said movable terminal member being penetratingly mounted to said first base wall and extending between said first and second terminal units, said movable contact being disposed on said movable terminal member and located between said first and second stationary contacts, said magnetically attractive member being capable of pushing said movable terminal member;

wherein, when said electromagnetic unit is energized and attracts said magnetically attractive member, said movable terminal member is pushed by said magnetically attractive member, and said movable contact contacts one of said first and second stationary contacts; and wherein, when said electromagnetic unit is de-energized, said magnetically attractive member is released from said electromagnetic unit, and said movable contact contacts the other one of said first and second stationary contacts.

2. The electromagnetic relay as claimed in claim 1, wherein said movable terminal member has a conductive leg extending through said first base wall, and a spring plate proximate to said magnetically attractive member and extending from said conductive leg to be interposed between said first and second terminal units, said movable contact being disposed on said spring plate, each of said conductive leg and said first and second terminal units being greater in thickness than said spring plate.

3. The electromagnetic relay as claimed in claim 2, wherein a ratio of the thickness of said conductive leg to the thickness of said spring plate ranges from 2 to 4.

4. The electromagnetic relay as claimed in claim 1, wherein said magnetically attractive member has an armature portion magnetically attractable by said electromagnetic unit, and an insulator portion opposite to said armature portion and proximate to said spring plate.

5. The electromagnetic relay as claimed in claim 1, wherein said magnetically attractive member includes a magnetically attractive plate proximate to said electromagnetic unit and bendable to extend into said receiving space, and an insulator plate connected to said magnetically attractive plate and proximate to said spring plate.

6. The electromagnetic relay as claimed in claim 5, wherein said magnetically attractive plate has an armature portion magnetically attractable by said electromagnetic unit, and a pushing portion that is bent from said armature portion and that is connected to said insulator plate, said pushing portion and said insulator plate being inserted into said receiving space.

7. The electromagnetic relay as claimed in claim 6, wherein said pushing portion has a slot, said insulator plate having two spaced-apart interlocking protrusions, interlocking with said slot such that said interlocking protrusions face said second base wall.

8. The electromagnetic relay as claimed in claim 1, wherein:

said electromagnetic unit includes a first end and a second end opposite to each other along the central line, said magnetically attractive member being proximate to said first end; and said armature unit further includes a magnetic member fixedly connected to said second end.

9. The electromagnetic relay as claimed in claim 8, wherein said magnetic member has a fixing end for fixing said second end of said electromagnetic unit thereto, and a connection end opposite to said fixing end and connected to said magnetically attractive member.

10. The electromagnetic relay as claimed in claim 8, wherein said second base wall has two fixed blocks formed on top thereof, said magnetic member being inserted between said fixed blocks.

* * * * *